(12) United States Patent
Van Slyke

(10) Patent No.: US 7,945,505 B2
(45) Date of Patent: May 17, 2011

(54) METHODS AND SYSTEMS FOR TRADING CONTRACTS AND OPERATING EXCHANGES

(75) Inventor: Oakley E. Van Slyke, San Clemente, CA (US)

(73) Assignee: Liquidity Development, LLC, San Clemente, CA (US)

( * ) Notice: Subject to any disclaimer, the term of this patent is extended or adjusted under 35 U.S.C. 154(b) by 41 days.

(21) Appl. No.: 12/075,597

(22) Filed: Mar. 12, 2008

(65) Prior Publication Data

US 2009/0234768 A1    Sep. 17, 2009

(51) Int. Cl.
G06Q 40/00    (2006.01)
(52) U.S. Cl. ...................................................... 705/37
(58) Field of Classification Search .......... 705/1, 35–37, 705/42, 400; 707/609, 705
See application file for complete search history.

(56) References Cited

U.S. PATENT DOCUMENTS

| | | | |
|---|---|---|---|
| 4,752,877 A | 6/1988 | Roberts et al. | |
| 4,766,539 A | 8/1988 | Fox | |
| 5,101,353 A | 3/1992 | Lupien et al. | |
| 5,704,045 A | 12/1997 | King et al. | |
| 5,966,700 A | 10/1999 | Gould et al. | |
| 5,970,479 A | 10/1999 | Shepard | |
| 5,974,390 A | 10/1999 | Ross | |
| 6,009,402 A | 12/1999 | Whitworth | |
| 6,026,364 A | 2/2000 | Whitworth | |
| 6,035,287 A | 3/2000 | Stallaert et al. | |
| 6,049,772 A | 4/2000 | Payne et al. | |
| 6,119,093 A | 9/2000 | Walker et al. | |
| 6,134,536 A | 10/2000 | Shepard | |
| 6,470,321 B1 | 10/2002 | Cumming et al. | |
| 6,594,635 B1 | 7/2003 | Erlanger | |
| 6,622,129 B1 | 9/2003 | Whitworth | |
| 7,020,632 B1 | 3/2006 | Kohls et al. | |
| 7,047,218 B1 | 5/2006 | Wallman | |
| 2002/0120555 A1 | 8/2002 | Lerner | |
| 2004/0006529 A1 | 1/2004 | Fung | |
| 2004/0111358 A1 | 6/2004 | Lange et al. | |
| 2005/0080705 A1 | 4/2005 | Chaganti | |
| 2005/0131801 A1* | 6/2005 | Glodjo | 705/37 |
| 2006/0178918 A1 | 8/2006 | Mikurak | |
| 2006/0224493 A1* | 10/2006 | Pinkava | 705/37 |
| 2007/0055608 A1 | 3/2007 | Steidlmayer et al. | |
| 2007/0192165 A1* | 8/2007 | Haggerty et al. | 705/10 |
| 2007/0233594 A1 | 10/2007 | Nafeh | |

(Continued)

OTHER PUBLICATIONS

International Search Report and Written Opinion of the International Searching Authority dated Apr. 16, 2009; PCT/US09/00951 Filed on Feb. 13, 2009.

(Continued)

*Primary Examiner* — Mary Cheung
(74) *Attorney, Agent, or Firm* — Vic Y. Lin; Innovation Capital Law Group, LLP

(57) ABSTRACT

Methods and systems are provided for operating a contracts exchange without conventional counterparty risk measures used by existing futures exchanges such as collateral, margin accounts, position limits, price change limits and regular settlement times. Traders on the contracts exchange hold substantially, or exclusively, cash and/or liquid exchange-traded assets or liabilities. Traders maintain transparent balance sheets which can be made available to third parties. A trader holding assets or liabilities that are illiquid or approaching illiquidity should demonstrate diligence in divesting such holdings. The trader's holdings are marked to their fair market value using acceptable accounting standards. Traders may also be required to obtain and maintain surety guarantees.

44 Claims, 5 Drawing Sheets

U.S. PATENT DOCUMENTS

2007/0282734 A1    12/2007    Huntley et al.
2008/0021809 A1    1/2008    Waelbroeck et al.
2008/0147535 A1    6/2008    Braig et al.

OTHER PUBLICATIONS

Esquivel, O, and Gornik-Tomaszewski, S.; Fair Value Measurements in Impairment Testing: How SFAS No. 157 increases Consistency and Comparability [online], Oct. 2007. [retrieved on Mar. 30, 2009]. Retrieved from the Internet: http://www.entrepreneur.com/tradejournals/article/170374837.html.

International Search Report and Written Opinion of the International Searching Authority (mailing date Dec. 3, 2009) for PCT/US09/61489, filed on Oct. 21, 2009.

International Search Report and Written Opinion of the International Searching Authority (mailing date Jul. 23, 2009) for PCT/US09/38804, filed on Mar. 30, 2009.

U.S. Non-Final Office Action dated Jan. 10, 2007 for U.S. Appl. No. 09/971,492.

U.S. Non-Final Office Action dated Apr. 27, 2007 for U.S. Appl. No. 09/971,492.

U.S. Non-Final Office Action dated Sep. 9, 2008 for U.S. Appl. No. 09/971,492.

U.S. Interview Summary dated Feb. 19, 2009 (mailing date Feb. 26, 2009) for U.S. Appl. No. 09/971,492.

Notice of Allowance and Fee(s) Due dated Apr. 17, 2009 for U.S. Appl. No. 09/971,492.

Notification Concerning Transmittal of International Preliminary Report on Patentability (Chapter 1 of the Patent Cooperation Treaty) (Mailing Date Sep. 23, 2010) for International Patent Application No. PCT/US2009/000951 filed on Feb. 13, 2009.

Notification Concerning Transmittal of International Preliminary Report on Patentability (Chapter 1 of the Patent Cooperation Treaty) (Mailing Date Oct. 14, 2010) for International Patent Application No. PCT/US2009/038804 filed on Mar. 30, 2009.

"The Changing Nature of Risk and the Challenges to Sound Risk Management in the New Global Financial Landscape", Financial Market Trends, Feb. 2000.

\* cited by examiner

METHODS AND SYSTEMS FOR TRADING CONTRACTS AND OPERATING EXCHANGES

BACKGROUND OF THE INVENTION

1. Field of the Invention

The present invention relates generally to trading contracts and operating exchanges.

2. Description of Prior Art and Related Information

A "securities exchange" refers to any trading apparatus that trades securities. Securities provide a unilateral right to an investor. Examples of securities are common stocks, preferred stocks, limited partnerships, tenants-in-common, promissory notes and industrial bonds. Examples of securities exchanges are the New York Stock Exchange and NASDAQ. The prices of securities are positive or zero because securities do not impose a liability on the holder of the security, so counterparty risk is not a factor. Accordingly, securities exchanges do not require investors to provide to the exchange collateral or margin accounts. Tens of millions of individuals invest in securities on the world's securities exchanges.

A "futures exchange" refers to any trading apparatus that trades contracts that may obligate a trader to make an additional payment in the future. The Commodity Futures Trading Commission (CFTC) regulates some types of futures trading in the United States.

Counterparty risk is the risk that a party to a contract will not perform as it is obligated to perform by the contract. Unlike securities exchanges (which do not have a claim to further payment by traders), futures exchanges must manage counterparty risk. A basic tool to reduce counterparty risk has been to require collateral from each counterparty. Specifically, traders on futures exchanges today generally are required to maintain margin accounts. Margin accounts can be wiped out in a matter of hours, however; to reduce this threat, a futures contracts exchange that requires traders to maintain margin accounts also imposes "daily price change limits" on the contracts listed on the exchange. Trading on a futures exchange has been costly because of the costs of counterparty risk measures, including risk identification, risk transfer, risk reduction and risk quantification as well as unmitigated counterparty losses.

SUMMARY OF THE INVENTION

Systems and methods described herein overcome the deficiencies in the prior art.

In one aspect, a method for trading interests in contracts is provided. The method comprises operating at least one contracts exchange, permitting at least one trader to trade on the at least one contracts exchange, and marginalizing the counterparty risk of the at least one trader. Information about the interests in the contracts may be provided to third parties. The trader may be required to have no assets or liabilities other than liquid exchange-traded contracts and liquid exchange-traded securities. Trading in the contracts exchange may be limited to traders that have transparent balance sheets.

The trader may be required to comply with a set of standards, including:

requiring the trader to be an entity that is regulated by securities laws to protect the interests of an investor who holds a security interest;

requiring that the trader has only a single class of ownership;

requiring the trader to be listed on a securities exchange;

permitting investors to trade the shares of the trader without requiring the investors to provide a surety, margin account or collateral;

making shares of the trader available for trade at all times;

requiring the trader to have its shares eligible for valuation by marking to market, which may require the trader to have its shares actively traded so as to be eligible for valuation using Level 1 of Financial Accounting Standard 157;

requiring the trader to maintain a surety guarantee, which may be a financial guarantee in force, or a surety policy;

requiring the trader to make available for inspection a balance sheet showing its assets and liabilities, including exchanges on which the assets and the liabilities are traded and current market prices of the assets and the liabilities; and/or at times specified by a contract, requiring the trader to make its balance sheet information available for inspection to a third party specified in the contract.

In another aspect, a method for improving the credit standing of a trader trading on a contracts exchange is provided. The method comprises securing a surety guarantee in case of default by the trader, paying a premium for the surety guarantee, and trading under a beneficial effect of the surety guarantee. The surety guarantee may comprise a performance bond or a financial guarantee. The method may require the trader to be a transparent trader. The method further comprising determining the premium for the surety guarantee which may be based on assets and liabilities of the trader, or on observations of prices of similar surety guarantees in competitive markets. The premium for the surety guarantee may be determined from time to time as the data changes.

In a further aspect, a method for making a trader's balance sheet transparent is provided. The method comprises substantially holding exchange-traded contracts, wherein the contracts comprise exchange-traded assets or exchange-traded liabilities, marking to market the exchange-traded contracts held by the trader, and marginalizing counterparty risk associated with the exchange-traded contracts.

The step of substantially holding exchange-traded contracts may comprise demonstrating diligence in divesting each holding that is not a liquid, exchange-traded asset or liability. This may involve showing that the trader has placed an order to sell at market price each asset that is not a liquid, exchange-traded asset and showing that the trader has placed an order to buy to close at market price each liability that is not a liquid, exchange-traded liability.

The step of substantially holding exchange-traded contracts may comprise holding only exchange-traded contracts. This may involve demonstrating that the trader's holdings are valued according to Level 1 or Level 2 of Financial Accounting Standard 157, which comprises demonstrating that each of the assets and liabilities on the trader's balance sheet is valued according to Level 1 or Level 2 of Financial Accounting Standard 157. The step of demonstrating that the trader's holdings are valued according to Level 1 or Level 2 of Financial Accounting Standard 157 comprises demonstrating that a time series of the trader's book value is not statistically significantly different from a time series constructed exclusively for the trader's assets and liabilities that are valued according to Level 1 or Level 2 of Financial Accounting Standard 157.

The step of demonstrating that the trader's holdings are valued according to Level 1 or Level 2 of Financial Accounting Standard 157 may comprise demonstrating that measures of Standard Portfolio Analysis for Risk (SPAN) for the trader are the same as for assets and liabilities of the trader that are valued according to Level 1 or Level 2 of Financial Accounting Standard 157.

The step of substantially holding exchange-traded contracts may comprise demonstrating that its holdings are valued according to Level 1 of Financial Accounting Standard 157. The step of marking to market the exchange-traded contracts held by the trader comprises making a balance sheet of all holdings of the trader available to a third party.

The method further comprises requiring the trader to hold a surety guarantee for performance of the trader with respect to the exchange-traded contracts.

In a further aspect, a method for operating a contracts exchange is provided. The method comprises trading contracts on the contracts exchange by traders, requiring each trader on the exchange to substantially limit its holdings to exchange-traded securities or exchange-traded contracts or cash, maintaining a balance sheet of each trader's holdings; and allowing each trader to trade on the exchange without collateral. Preferably, each trader is required to have no liabilities other than liquid exchange-traded contracts and no assets other than liquid exchange-traded contracts or liquid exchange-traded securities or cash. This may involve requiring each trader to demonstrate diligence in divesting each holding that is not a liquid, exchange-traded asset or liability, such as by requiring each trader to show that the trader has placed an order to sell at market price each asset that is not a liquid, exchange-traded asset and to show that the trader has placed an order to buy to close at market price each liability that is not a liquid, exchange-traded liability.

The step of requiring each trader on the exchange to substantially limit its holdings to exchange-traded securities or exchange-traded contracts or cash may comprise requiring each trader to demonstrate that the trader's holdings are marked to their fair market value using the methods of Level 1 or Level 2 of Financial Accounting Standard 157. This may involve requiring each trader to demonstrate that each asset and liability on the trader's balance sheet is valued according to Level 1 or Level 2 of Financial Accounting Standard 157, or requiring each trader to demonstrate that a time series of the trader's book value is not statistically significantly different from a time series constructed exclusively for the trader's assets and liabilities that are valued according to Level 1 or Level 2 of Financial Accounting Standard 157, or requiring each trader to demonstrate that measures of Standard Portfolio Analysis for Risk (SPAN) for the trader are the same as for assets and liabilities of the trader that are valued according to Level 1 or Level 2 of Financial Accounting Standard 157, or making the balance sheet of all holdings of the trader available to a third party.

The step of allowing each trader to trade on the exchange without collateral further comprises allowing each trader to trade on the exchange without a margin account, or without price change limits. The method may further comprise the step of requiring each trader to obtain a surety guarantee. The surety guarantee may comprise a financial guarantee, a financial guarantee for a liability of the trader, a performance bond, or a performance bond for an obligation of the trader.

A further method for operating a contracts exchange is provided. The method comprises trading contracts on a contracts exchange by traders, requiring each trader on the exchange to substantially hold exchange-traded contracts or exchange-traded securities or cash, maintaining a balance sheet of each trader's holdings; and allowing each trader to trade on the exchange without at least one conventional counterparty risk measures. The trader may be required to hold only exchange-traded contracts or exchange-traded securities or cash.

The method further comprises requiring the trader to report in real time the holdings and their fair market value. Requiring each trader on the exchange to substantially hold exchange-traded contracts or exchange-traded securities or cash comprises requiring each trader to demonstrate diligence in divesting each holding that is not a liquid, exchange-traded asset or liability, such as requiring each trader to show that the trader has placed an order to sell at market price each asset that is not a liquid, exchange-traded asset and to show that the trader has placed an order to buy to close at market price each liability that is not a liquid, exchange-traded liability.

The step of allowing each trader to trade on the exchange without at least one conventional counterparty risk measure comprises allowing each trader to trade on the exchange without a margin account, collateral or price change limits. The step of allowing each trader to trade on the exchange without at least one conventional counterparty risk measure comprises operating the contracts exchange with settlement periods other than once or twice a day, such as without settlement times. The step of operating the contracts exchange with settlement periods other than once or twice a day comprises operating the contracts exchange with settlement periods so frequent as to essentially eliminate moments at which contracts are not settled.

The method further comprises requiring each trader to obtain a surety guarantee, such as a financial guarantee, a financial guarantee for a liability of the trader, a performance bond, or a performance bond for an obligation of the trader.

The step of requiring each trader on the exchange to substantially hold exchange-traded contracts or exchange-traded securities or cash comprises requiring each trader to demonstrate that the trader's holdings are marked to their fair market value using the methods of Level 1 or Level 2 of Financial Accounting Standard 157, which may comprise requiring each trader to demonstrate that each asset and liability on the trader's balance sheet is valued according to Level 1 or Level 2 of Financial Accounting Standard 157, or requiring each trader to demonstrate that a time series of the trader's book value is not statistically significantly different from a time series constructed exclusively for the trader's assets and liabilities that are valued according to Level 1 or Level 2 of Financial Accounting Standard 157, or requiring each trader to demonstrate that measures of Standard Portfolio Analysis for Risk (SPAN) for the trader are the same as for assets and liabilities of the trader that are valued according to Level 1 or Level 2 of Financial Accounting Standard 157.

The method further comprises making the balance sheet of holdings of the traders available to a third party.

DETAILED DESCRIPTION OF THE PREFERRED EMBODIMENTS

The various embodiments can now be better understood by turning to the following detailed description. It is to be expressly understood that the illustrated embodiments are set forth as examples and not by way of limitations on the invention as ultimately defined in the claims.

Throughout this specification, the term "contracts exchange" refers to any trading apparatus that trades contracts other than securities. The prices of such tradable contracts may be positive, negative, or varying from positive to negative. An example of a tradable contract is a commodities futures contract.

In any contract, the party that is owed or is potentially owed a benefit is exposed to a risk that a party to the contract that owes or potentially owes a benefit will not provide the benefit under the terms of the contract. This risk is called counterparty risk. By nature, a contracts exchange will operate with greater counterparty risk than a securities exchange. The costs of executing transactions on existing futures exchanges are today much greater than the costs of executing transactions on securities exchanges. The higher costs associated with executing transactions on existing futures exchanges relate to the conventional risk measures on futures exchanges, which conventional risk measures are not used or required by securities exchanges. The preferred systems and methods described herein enable contracts exchanges to operate with counterparty risk and cost structures that approach those of securities exchanges. Throughout this specification, any counterparty risk that is a risk of financial loss is termed a default risk.

Figure 1:
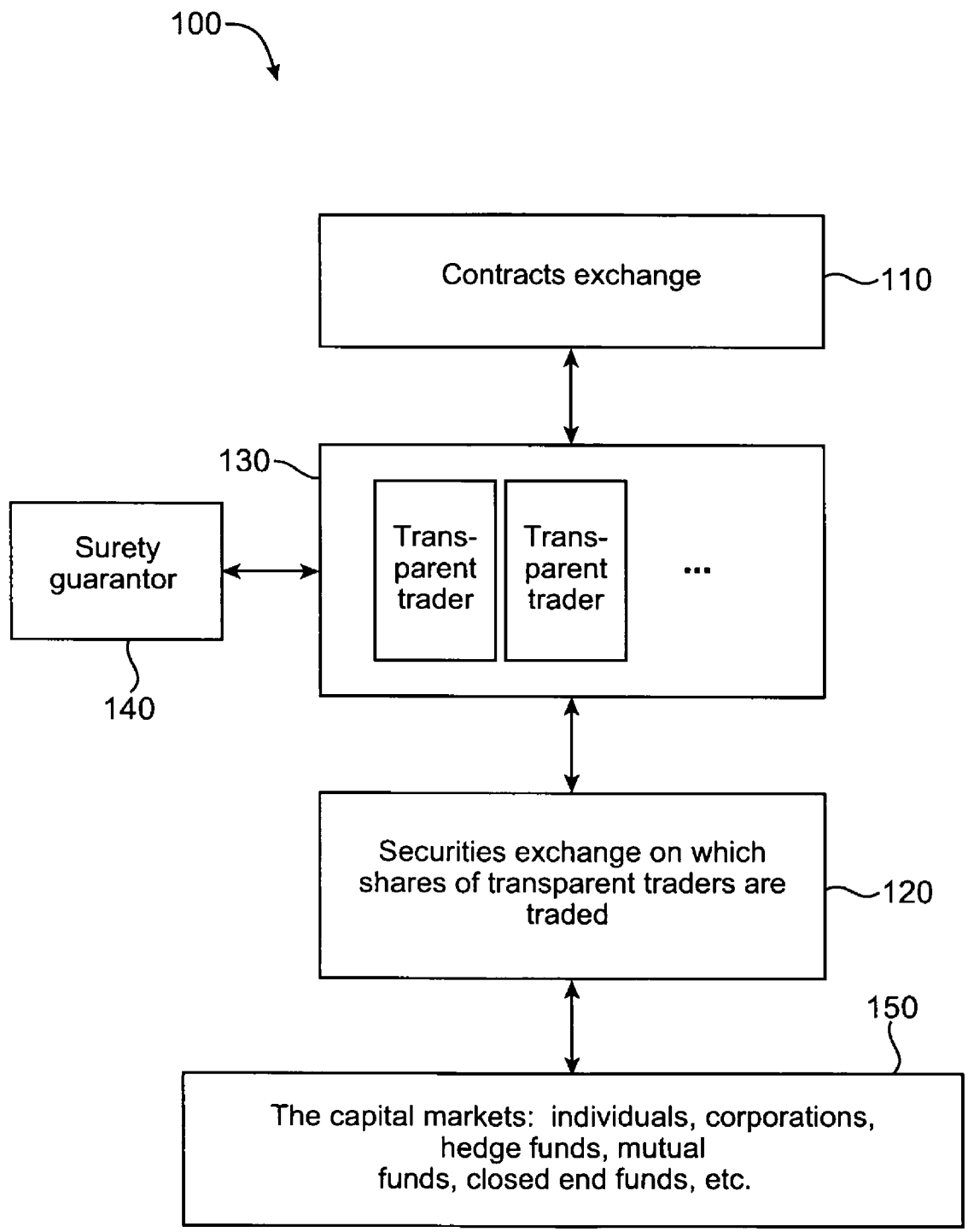
FIG. 1 is a diagram of a multi-exchange trading system.

FIG. 1 is a diagram of a multi-exchange trading system 100. The trading system 100 comprises a contracts exchange 110, a securities exchange 120 and transparent traders 130. The contracts exchange 110 operates without requiring at least one conventional method of counterparty risk management, such as margin accounts or other collateral, from the transparent traders 130. Trading on the contracts exchange 110 is preferably limited to transparent traders 130.

Transparent traders 130 preferably comprise leveraged investment portfolios whose holdings are substantially marked to market preferably continuously, typically comprising only contracts listed on a contracts exchange 110 and securities listed on a securities exchange 120. Transparent traders 130 trade and hold positions in contracts on the contracts exchange 110. Such positions may include a risk of loss to the trader many times greater than the market price. Accordingly, some transparent traders may have unlimited liability and have share prices that may be positive, negative or varying from positive to negative. These can be listed on a contracts exchange 110.

A transparent trader 130 marginalizes its risk of default as explained below, including having a surety guarantor 140. A transparent trader 130 may adopt any of several practical legal forms. In the preferred embodiment, some transparent traders 130 may comprise limited-liability entities. Limited-liability transparent traders have shares that trade at positive values. These can be listed on a securities exchange 120. Shares, or securities, of the transparent traders can then be traded on the securities exchange 120 by investors which comprise the capital markets 150, such as individuals, corporations, hedge funds, mutual funds, and others, and special purpose funds formed to invest in transparent traders. It follows that the multi-exchange system 100 enables the capital markets 150 to trade in the shares of traders that trade contracts such as derivatives, commodity futures, debt, and contingent liabilities. Because the holdings of the transparent traders 130 are marked to market, the capital markets 150 can compare the holdings of the transparent traders 130 and adjust their investments accordingly preferably nearly continuously.

When its default risk has been marginalized, a transparent trader 130 exposes the contracts exchange 110 to counterparty risk that is not significant. In one preferred embodiment, when transparent traders bid, offer, buy or sell on a contracts exchange, the prices are not significantly affected by which transparent trader is issuing the bid, offer, buy or sell order. Marginalizing the counterparty risk of transparent traders enables the traders to trade contracts without having to provide to the contracts exchange 110 collateral or margin accounts. The method 100 also comprises a preferred method of creating a contracts exchange without at least one conventional counterparty risk measure, such as margin accounts, strict position limits, daily settlements and daily price change limits. For example, a contracts exchange that does not employ the conventional counterparty risk measures of margin accounts and position limits is enabled to operate without price change limits.

Figure 2:
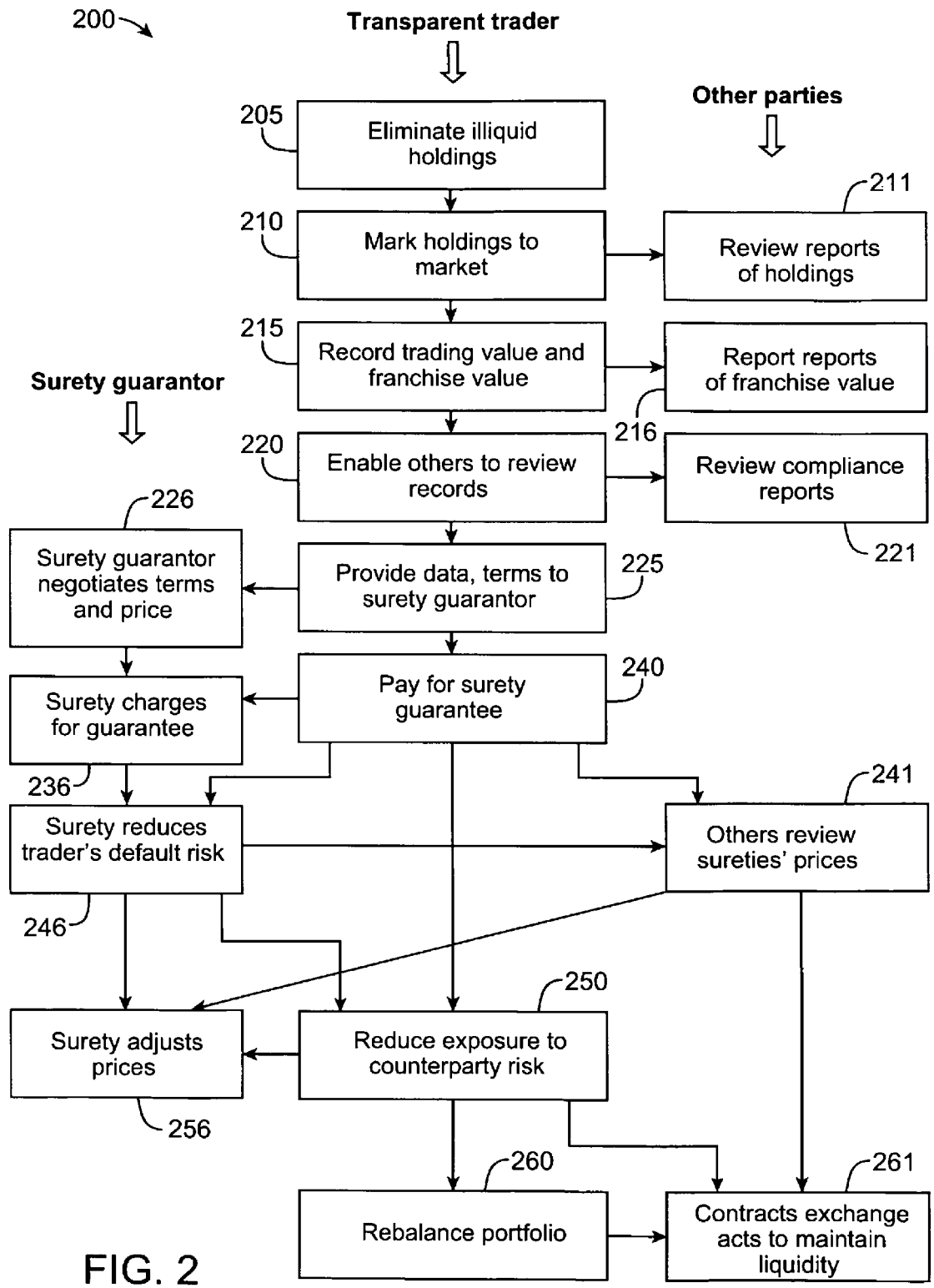
FIG. 2 is a diagram illustrating a preferred method of marginalizing counterparty risk of traders.

FIG. 2 illustrates a preferred method 200 for marginalizing default risk to create a transparent trader. It is to be expressly understood that the steps in the preferred method 200 may occur in any sequence, and not necessarily in the vertical order shown in FIG. 2.

In step 205, the transparent trader eliminates from its portfolio to the extent practical assets and liabilities that are not deemed to be liquid. Generally, the bulk of the actual work is done while the holding is still liquid. According to the method 200, the transparent trader may nonetheless retain some illiquid assets and liabilities. In the preferred embodiment, the transparent trader holds no assets or liabilities other than cash, liquid exchange-traded contracts and/or liquid exchanged-traded securities.

Figure 3:
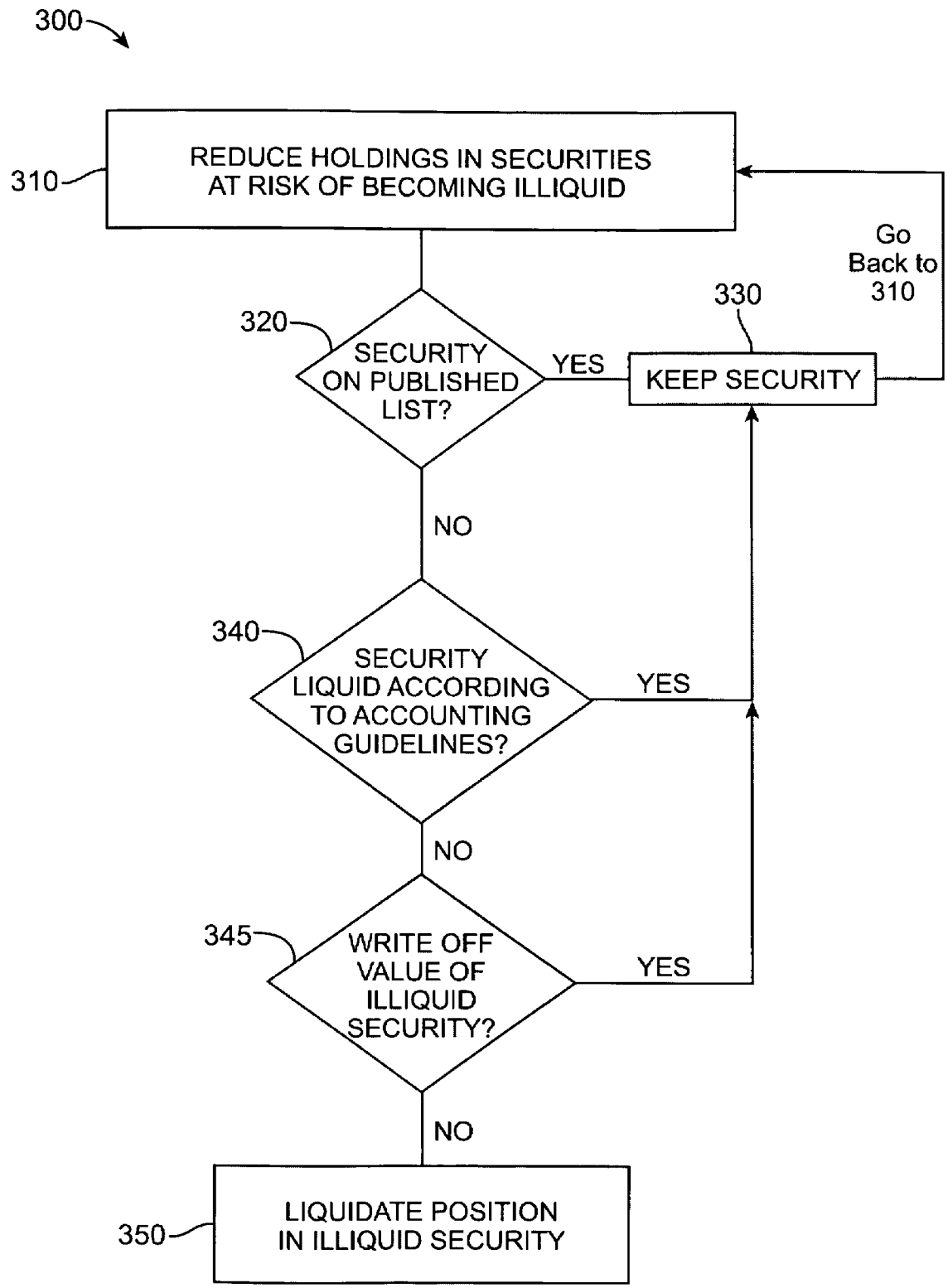
FIG. 3 is a flow diagram illustrating a preferred method for a trader to reduce or eliminate illiquid securities from its portfolio.

FIG. 3 shows a preferred process 300 by which a trader, such as a transparent trader, can eliminate from its portfolio securities that are not liquid or are at risk of becoming illiquid, and demonstrate diligence in divesting such securities. As a result of this process 300, the assets held by a transparent trader will substantially comprise cash and/or liquid exchange-traded securities. In the preferred embodiment, the transparent trader will hold no assets other than cash and/or liquid exchange-traded securities. The transparent trader has an interest in selling all or part of its holdings of an asset if the asset's share price is unstable. On the other side of market, an investor that is not significantly exposed has an interest in earning a risk premium by buying an asset at a price that is depressed by price volatility. Accordingly, the transparent trader will gather information and pay to liquidate positions that are at risk of becoming illiquid. The following list illustrates the sources of information that a transparent trader may draw upon in deciding if a particular holding is at risk of becoming illiquid: securities exchanges, contracts exchanges, sureties, rating agencies, advisors and journalists, regulators, regulatory filings including "forward-looking statements" and other shareholder communications. Of course, no list of sources of information could be complete, so this list illustrates the work that the transparent trader might do when gathering information.

At step 310, the transparent trader reduces its holdings in securities that are at risk of becoming illiquid. For example, suppose units of closed-end fund "A" are on a published list on a particular day. Assume for this example that "A" is trading for $6 per share but that the security is not clearly liquid. Because of the risk that at some point in time the algorithm might report that the asset is not to be considered liquid, the transparent trader places a "limit order" to sell the asset at the market price but not less than $5 per share and books a loss of $1 for doing so.

At step 320, the transparent trader refers to a published list of liquid securities to determine that its holdings are liquid. Examples of publishers who are likely to publish lists of liquid securities are securities exchanges, sureties, rating agencies, regulators and associations of regulators, publishers such as Dow Jones, and associations of exchanges or traders. A Yes confirms that the security is deemed liquid, which proceeds to step 330 to keep the security. Since this method 300 is preferably performed on a regular basis, keeping the security at step 330 preferably requires the transparent trader to go back to step 310 at some point in the future to repeat the method 300. A No goes to step 340. Note that steps 310, 320 and 340 may be done in any order and as often as needed.

At step 340, the transparent trader refers to accounting guidelines to determine if the security is considered liquid. Generally this may include employing an algorithm to apply accounting guidelines to determine a Yes or No, along with additional information. In our example, at some point in time, "A" was removed from the list of liquid securities. Then the transparent trader uses an algorithm to apply accounting guidelines to determine a Yes or No with respect to the liquidity status of the holding. A No at step 340 takes the transparent trader to step 345.

At step 345, the transparent trader decides whether or not to write off the value of the illiquid security. A Yes at step 345 takes the transparent trader back to step 330 where the security is kept and the process 300 is repeated starting back at step 310. A No at step 345 takes the transparent trader to step 350.

At step 350, the transparent trader liquidates its position in the illiquid asset or demonstrates diligence in attempting to liquidate. This involves selling the asset and writing off the value of any unsold shares. The transparent trader may carry out a variation of the steps described here, which are intended to provide examples of what it means to liquidate a position in an asset. Generally, the transparent trader issues a sell order. Examples of sell orders: including, but not limited to:

an order to sell all of the securities at the market price;
an order to sell a portion of the holdings at the market price;
an order to sell a portion of the holdings each day at the market price for a series of days;
an exercise of a right to call a Dutch auction of all holders;
an order to sell a portion of the holdings with a limit on the minimum price that would be accepted;
an order to sell all of the holdings with a limit on the minimum price that would be accepted; and/or
a private sale.

This list is not intended to be a complete list but to illustrate the ways that positions that have been written off can be liquidated. A private sale may include the sale of a portion of the holdings or all of the holdings to a third party. A private sale may also include a sale of a package of assets and liabilities to a third party. The proceeds of a sale may be cash but this is not necessary.

Continuing the example of the closed-end fund "A": In this example, the trader does not follow the usual practice of placing a market order to sell; rather, when the accounting rules indicate that the asset is not liquid, the transparent trader changes the book value of the security to zero, and takes a loss of $5 per share. At this moment, the transparent trader has recorded a total loss of $6 per share on the asset. Continuing this example, the asset does not sell and the holdings are significant, so the transparent trader arranges a private sale according to the terms of which the assets are sold for an average price of $4 (net of expenses). At this moment in this example, the transparent trader records a gain of $4 for each share of the liabilities.

Figure 4:
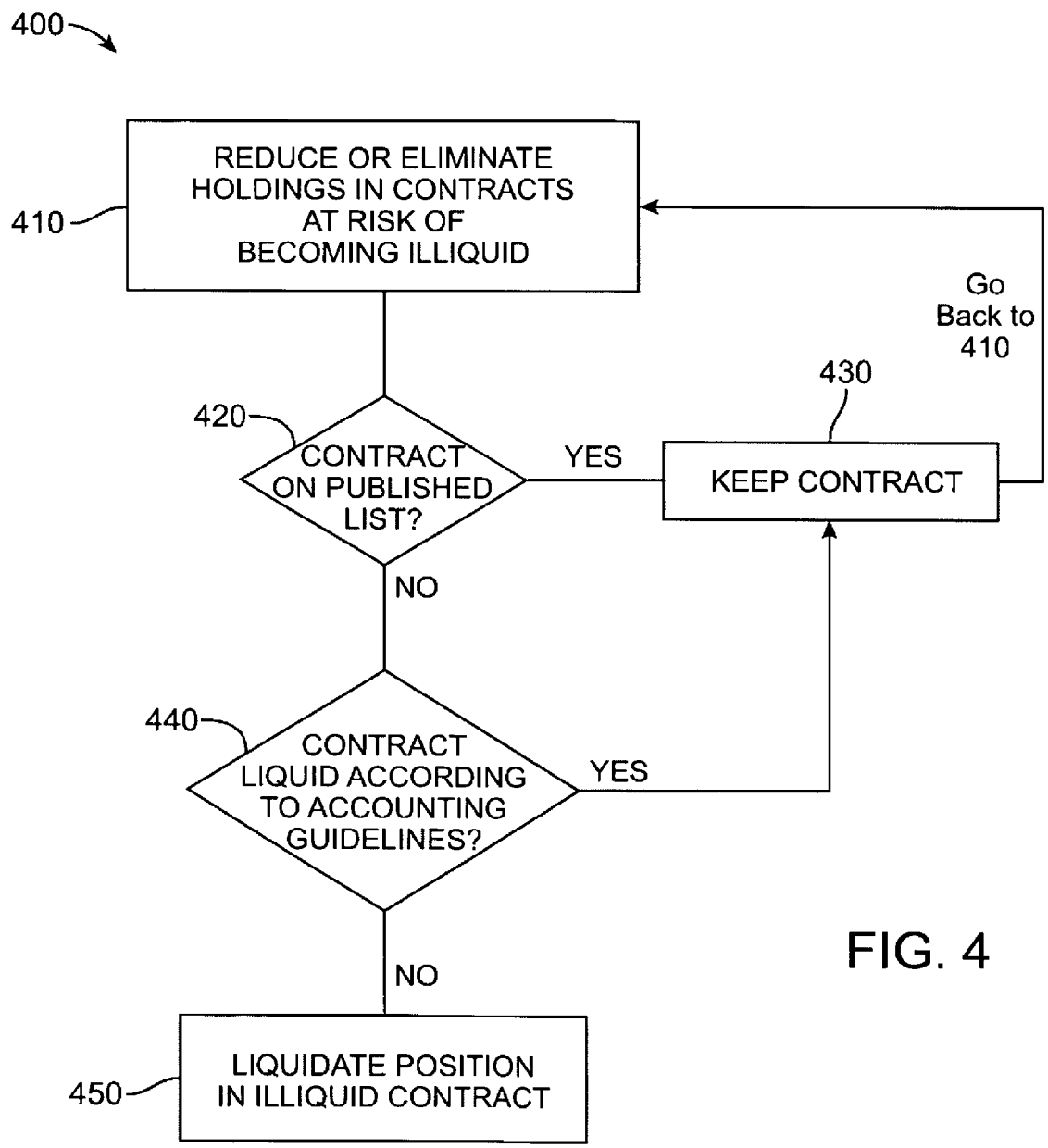
FIG. 4 is a flow diagram illustrating a preferred method for a trader to reduce or eliminate illiquid contracts from its portfolio.

FIG. 4 shows the process 400 by which a trader, such as a transparent trader, can eliminate from its portfolio contracts, including liabilities, that are illiquid or approaching illiquidity, and demonstrate diligence in divesting such contracts. As a result of this process 400, the liabilities held by a transparent trader will substantially comprise liquid exchange-traded contracts. In the preferred embodiment, the transparent trader will hold no liabilities other than liquid exchange-traded contracts. The transparent trader has an interest in laying off all or part of its holdings of a liability if the contract's share price is volatile. On the other side of the market, a trader that is not significantly exposed has an interest in earning a risk premium by writing a contract at a price that reflects such price volatility. One difference between the preferred methods illustrated in FIG. 4 and FIG. 3 is that the holder of shares in a contract generally cannot mark the value of its holdings to a model the way that the holder of a security can write off the value of the security.

At step 410, the transparent trader reduces or eliminates its holdings in contracts that are at risk of becoming illiquid. If the transparent trader does not completely eliminate its holdings of a particular liability before that liability is deemed illiquid, it can expect to pay a much higher price at step 450.

Consider, for example, units of a commodity "put" "B". Assume for this example that the underlying commodity is trading at $46, the strike price in contract "B" is $50, the expiration date is several months away. Contract "B" therefore obligates the seller (or "writer") to buy the commodity worth $46 in exchange for payment of $50. To the writer, this is therefore a liability. To reduce its holdings, the writer of a put issues what is called a "buy to close" order. Assume that units of "B" appear on a published list of liquid contracts on a particular day. Assume further that "B"'s most recent price data is as follows:

bid (will pay this price for the right to sell the commodity at the $50 strike price), $4.00;
ask (will accept this price to accept the obligation to sell the commodity at the $50 strike price), $4.50;
spread $0.50.

As a seller, the transparent trader carries the liability at the ask price gross of spread. That is, the valuation of the liability would be at approximately $4.50 per unit.

Assume further that contract "B" is not widely traded. Because of the risk that at some point in time an algorithm implementing an accounting rule might report that the contract is not to be considered liquid, the transparent trader places a "buy to close" order at a price not to exceed $5.00 per unit (i.e., a limit order) and books a loss of $0.50 for doing so. Continuing the example, assume that the bid was not successful (asking prices, if any, had increased to more than $5.00) and that trading becomes less frequent along with the jump in asking price. The transparent trader then has a greater incentive to lay off its exposure to contract "B." In this example, in step 410 the transparent trader places a "buy to close" order at a price not to exceed $6.00 per unit, and values the liability at $6.00. Each time the valuation increases, the transparent trader sells assets if appropriate so as to maintain both the cash to pay if the bid is accepted and a reasonable balance of cash on hand. At step 420, the transparent trader refers to a published list of liquid contracts to determine that its holdings are liquid. Publishers are similar to those described at step 320. A Yes confirms that the contract is deemed liquid, which then proceeds to step 430 to keep the contract. A No goes to step 440.

At step 440, the transparent trader refers to accounting guidelines to determine if the contract is considered liquid. As in step 340, generally this may include employing an algorithm to apply a common guidelines to determine a Yes or No, along with additional information. A No at step 440 takes the transparent trader to step 450. Note that steps 410, 420 and 440 may be done in any order and as often as needed.

Consider again the example of contract "B." Assume that at some point in time, publishers remove contract "B" from lists of liquid contracts. Assuming also that the transparent trader has not yet been successful in buying sufficient units of "B" to close out its liability, it advances to step 420, where it receives a No, taking it to step 440. Then the transparent trader uses an algorithm to apply accounting guidelines to determine a Yes or No with respect to the liquidity status of contract B. Concurrently with those calculations, the transparent trader issues a "buy to close" limit order for sufficient units to close out its liability at a price not to exceed $10. Concurrently with that buy order the transparent trader issues orders to sell sufficient assets to raise cash to cover the buy order and marks its liability to $10 per unit (again, in this example). So long as the buy order remains unfulfilled and the algorithm indicates that the contract can be accounted for as liquid, the buy order and the $10 valuation may remain in place. However, when the algorithm indicates that the contract may not be accounted for as liquid, the transparent trader gets a No at step 440 and advances to step 450.

At step 450, the transparent trader liquidates its position in the illiquid contract or demonstrates diligence in attempting to liquidate. The transparent trader may carry out a variation of the steps described in this paragraph, steps which are intended to provide examples of how to liquidate a position in a liability. Unlike the steps involved in liquidating a security shown in FIG. 3, the transparent trader may be unable to write off the liability or otherwise value it by applying a rule or model because the lack of liquidity may create an open-ended exposure to loss that cannot be detected by a rule or model; there may of course be exceptions, particularly if a contract explicitly provides for a maximum liability. This might be the case in our example of contract "B," which obligates the transparent trader to pay $50 for units that may be worthless. Liquidating its position may comprise the transparent trader selling assets to create cash on hand which it estimates to be sufficient to pay to lay off the liability and issues an order on the contracts exchange to liquidate the holding.

Examples of orders to liquidate liabilities include, but are not limited to:

an order to liquidate all of the holdings at the market price;

an order to liquidate a portion of the holdings at the market price;

an order to liquidate a portion of the holdings each day at the market price for a series of days;

an exercise of a right to call a Dutch auction of all holders;

an order to liquidate a portion of the holdings with a limit on the maximum price that would be accepted;

an order to liquidate all of the holdings with a limit on the maximum price that would be accepted; and/or a private placement.

This list is not intended to be a complete list but illustrate the ways that liabilities can be liquidated. A private sale may include the sale of a portion of the holdings or all of the holdings to a third party. A private sale may also include a sale of a package of assets and liabilities to a third party. The payment for a sale of a liability may be cash but this is not necessary, particularly for a private placement. As noted above, in the most general case, the transparent trader will have liquidated its problem assets and liabilities while they are still considered liquid.

Continuing the example of contract "B": In this example, the transparent trader's shares of contract "B" were marked to $10.00 before the end of step 440. At the end of step 440, those shares are deemed not liquid. If that liability has a maximum exposure of $50, then the transparent trader might be permitted to carry that liability at its maximum value, possibly subject to the requirement to hold that $50 in cash. More generally, however, and in the case of contract "B," the transparent trader has a strong incentive to liquidate assets and to raise its offer price so as to return to the status of being a transparent trader. Any transparent trader holding units of the asset side of the contract also has an incentive to liquidate its holdings in step 450 because the units are not deemed liquid. The transparent trader issues a "buy to close" order at the market price for all its units which leads to liquidation of all of its remaining holdings of contract "B"—in this example, at an average cost of $11, incurring a loss of $1 per share in step 450.

Referring back to step 205 of FIG. 2, the risk of illiquidity creates the opportunity for a sale price to be reached. Specifically, as the trading in a contract becomes less frequent or the volatility of the bids or offers increases, the holder of a liability has an increasing incentive to offer to pay a higher price and the holder of an asset has an increasing incentive to offer to accept a lower price. Therefore, spreads will diminish in the face of illiquidity even if the prices are increasing or decreasing rapidly.

Because of transaction fees, it is possible and can be expected to happen from time to time that both sides of a contract are liabilities. For example, if the price of the underlying commodity declined at just the right time as liquidity diminished, then a Dutch auction might have led to the holders of the put and the holders of the option to pay $0.05 per share, for a total of $0.10, the transaction fee (in this example).

Also in step 205, the transparent trader pays for services it receives and receives payment for services it provides so as to reduce each account payable and account receivable to be not financially significant. Premiums for surety guarantees, management contracts and the like may be paid sufficiently frequently that unpaid amounts or overpaid amounts are not financially significant. For example, transparent trader G has exchange-traded assets totaling $20 billion and monthly payments for management services that range from $9 to $12 million; transparent trader G pays $350,000 each day to the manager, which keeps the unpaid or overpaid balance on this contract less than $2 million, an amount smaller than the hourly fluctuation in transparent trader G's book value. Continuing with this example, trader G also pays the premium for its surety guarantee daily using a formula in the surety contract; this keeps the unpaid or overpaid balance at zero at the end of each day.

In step 210, the transparent trader marks to market its assets and liabilities at market value using an acceptable financial standard, such as Level 1 or Level 2 of Financial Accounting Standard 157, or FAS157, which is incorporated by reference as if fully set forth herein. The transparent trader maintains to the extent practical a record of its net worth in real time reflecting the market values of its assets and liabilities. These records are maintained in electronic media and other media as appropriate. This step may also include demonstrating that a time series of the trader's book value is not statistically significantly different from a time series constructed exclusively for the trader's assets and liabilities that are valued using an acceptable financial standard. This step may also include demonstrating that measures of counterparty risk for the trader, such as Standard Portfolio Analysis for Risk (SPAN), which is incorporated by reference as if fully set forth herein, are the same as for assets and liabilities of the trader that are valued at market value. Reports of holdings are reviewed by other parties in step 211.

Practices for valuing assets and liabilities at their market value are set forth by regulators and accounting authorities. With respect to the valuation of liabilities under the prior art, futures exchanges have employed margin accounts as described above. The transparent trader will have the opportunity never before presented to apply such practices to exchange-traded liabilities for which there are no requirements for collateral or margin accounts. One implication that can be foreseen is that the transparent trader will reflect any spread between the bid price and the offer price in its valuations.

In step 215, the transparent trader records to the extent practical in real time a record of its trading value and, by comparison to its net asset value, a record of its franchise value, which is the excess of its trading value over its net asset value. At step 216, the reports of franchise value are reviewed by third parties. If the transparent trader is listed on a securities exchange and its shares or units are deemed to be liquid, this can be accomplished by recording each sale on that exchange of the trader's units or shares, including the price bid, the price offered and the spread. If the transparent trader is listed on a securities exchange but trading of that transparent trader's units or shares is not considered to be liquid (see step 205), it can change its holdings in order to promote trading in its shares.

For example, if the transparent trader's holdings are moving in tandem with broader stock market averages, the trader can increase the liquidity of its own shares by reducing the coupling of its results with the market's broad results by reducing its holdings of both assets and liabilities that are moving with the market average. That will also lower the leverage of that trader; in principle, a trader that has a low leverage ratio can further increase its liquidity by underwriting liabilities and buying assets that appear in the portfolios of other traders whose shares are more liquid. There may be practical impediments to using increased leverage to stimulate trading in the transparent trader's shares. In the extreme, if the capital markets implicitly evaluate the management of the transparent trader as a liability rather than an asset, buyers of the trader's shares will be hard to find, and the net asset value will be below the average or even negative. In this situation, the transparent trader can stimulate trading by continuing to reduce its holdings of assets and liabilities and using some of its cash to create new buyers, for example by repurchasing its own shares on the securities exchange.

In step 220, the transparent trader enables authorized parties to review its records. For example, this may be accomplished by providing a password to each authorized party; this strategy applies to any machine-based method of storing the transparent trader's records. As another example, the transparent trader may submit written records to third parties, e.g., in compliance with contractual or regulatory requirements. In step 221, the compliance reports are reviewed by third parties.

In step 225, the transparent trader provides data, including the desired terms and pricing information, to a surety guarantor. In step 226, a surety guarantor uses data, including but not limited to the transparent traders' records, to quantify the risk associated with an inability of the transparent trader to pay its obligations when due, and negotiates terms and price. The terms may include that the contract is a performance bond, a financial guarantee or another type of contract.

In step 236, a surety guarantor charges an appropriate price, or premium, for a surety guarantee. The appropriate price may be a single premium for a defined period of time or for a defined set of activities by the transparent trader. Alternatively, the appropriate price may be a formula that computes the price for the surety guarantee by taking into account the assets and liabilities of the trader, such as by measuring the changes in such assets and liabilities held by that transparent trader, and other data. The surety guarantor may use parameters developed from a wide range of surety and other contract prices. Premiums for a particular surety guarantee may also be determined, at least in part, using step 241 observing prices of similar guarantees in competitive markets. In step 240, the transparent trader pays a surety guarantor the agreed-upon price.

In step 246, a surety guarantor takes appropriate action to reduce the transparent trader's default risk. Actions may be limited by law, regulation, transaction cost, or other practical constraints. By way of example and not by limitation, actions that the surety guarantor might be able to take depending on contractual and other constraints include, but are not limited to, the following:

Place a sell order for a holding of the transparent trader (either asset or liability) at the market price;

Direct the transparent trader to sell a liquid asset at the market price;

Direct the transparent trader to lay off a liquid liability at the market price;

Buy an illiquid asset from the transparent trader at its booked value or at a discount from its booked value. Example: TT has 100 units of Iraq Oil Company futures carried at $100 per unit and its surety guarantee gives its surety guarantor a right to buy illiquid assets from TT at 2% below booked value; on the day these shares become unlisted as liquid assets, the surety buys these shares by paying TT $9,800 and directing TT to transfer the shares;

Assume an illiquid liability from the transparent trader at its booked value or at a premium over its booked value;

Take over a transparent trader if contractual terms are not met. Example: Surety guarantor takes over all shares of TT at the market price because that market price is less than 1.02 times TT's book value;

Consider for example a transparent trader "TH" that is holding units of contract "H" which is a liability that will increase in cost if a hurricane makes landfall in Hawaii. As a storm increasingly threatens Hawaii, transparent traders holding units of "H" offer them at ever-higher prices; TH records a loss each time the price increases but does not reduce its exposure. Assume further that TH's surety contract gives TH's surety guarantor "SG" a right to direct a private transfer of any or all of TH's units exposed to hurricanes in exchange for units in contract B which is not exposed to hurricane loss, valuing both at the booked value, that is, market price. As the hurricane approaches Hawaii, the increase in TH's leverage ratio and surety premium leads SG to exercise its right, thereby leaving the net worth of TH unchanged but reducing its exposure to further loss from the hurricane. The transparent trader on the other side of the transaction has, in this example, increased its exposure to wind loss and decreased its exposure to a loss if the price of commodity B should increase; its surety guarantor (presumably not SG) may increase its surety premium rates; it is free to lay off the units of H or to hedge its exposure to this particular hurricane. Meanwhile, SG has decreased its exposure to a default by TH.

Consider further a special case of the previous paragraph in which the surety guarantor SG is the exchange on which TH trades units of contract "H." Assume further that the exchange SG acts as a surety guarantor for all traders that are permitted to trade on exchange SG. In this case, the exchange SG has a contractual right to direct a private transfer of TH's units exposed to hurricanes to a trader that is not trading on SG (otherwise, SG's risk would not be transferred). This implies that contract "H" is trading on at least one other exchange, in this case. Finally, we see that in this case, the exchange SG has a relationship with a transparent trader not listed on SG sufficiently commanding that that trader can be directed to increase its exposure to wind loss and decrease its exposure to risk from commodity B.

In step 241, authorized parties review the prices charged by surety guarantors in the context of the contracts' terms. Examples of persons who might be authorized to do so include without limitation: an association representing surety guarantors; a contracts exchange; regulatory authorities; accountants and auditors; an association representing transparent traders; a securities exchange on which a transparent trader is listed.

In step 250, the transparent trader reduces the contracts exchange's exposure to counterparty risk to the degree that the transparent trader's counterparty risk is not significant.

Figure 5:
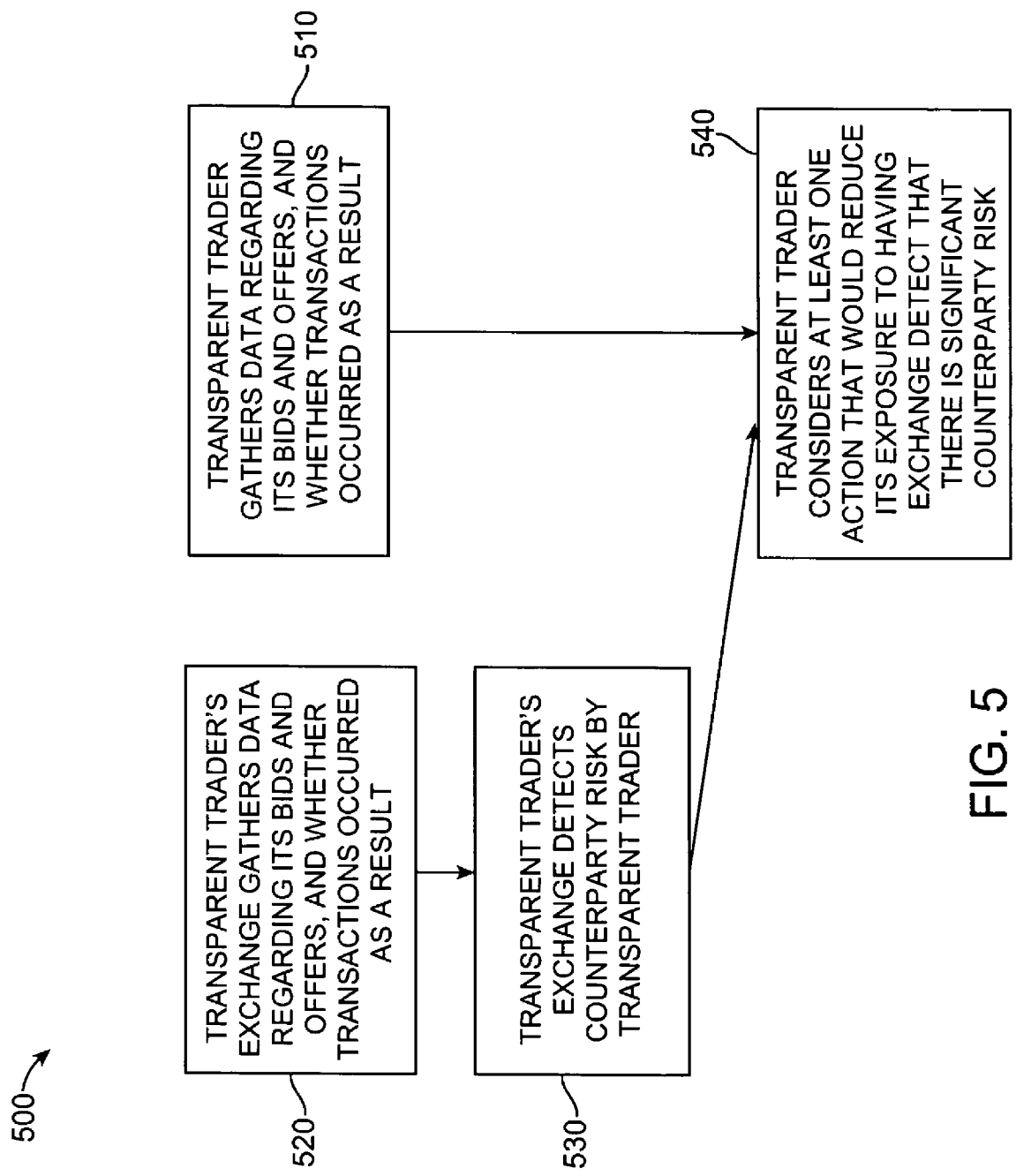
FIG. 5 is a diagram illustrating a preferred method for a trader to reduce a contracts exchange's exposure to counterparty risk.

FIG. 5 shows a preferred process 500 by which a transparent trader can reduce a contracts exchange's exposure to counterparty risk to the degree that the transparent trader's counterparty risk is not significant.

In step 510, the transparent trader gathers data regarding its bids and offers, noting whether or not transactions occurred as a result.

In step 520, the trader's contracts exchange gathers data regarding the transparent trader's bids and offers, noting whether or not transactions resulted.

In step 530, the contracts exchange applies an algorithm to detect the transparent trader's counterparty risk. It reports results to the transparent trader. The following topics might without limitation be mentioned in that report: the data; algorithms that process the data; a list of exceptional values that encourage trading activity by the transparent trader.

In step 540, the transparent trader considers at least one action that would reduce its exposure to having the exchange's algorithm indicate that there is significant counterparty risk. Examples of considerations for step 540 include without limitation: the trader replaces its surety guarantor with a stronger guarantor; the trader applies an algorithm that detects exceptional values in the exchange's report and issues market orders to reduce those values; the trader applies an algorithm to continually rebalance its portfolio, reducing its holdings of assets and liabilities as they increase in share of the portfolio; the trader follows patterns detected in the activities of other traders; the trader observes the holdings that most affect its surety premium and reduces its exposure to such holdings; the trader employs judgment to reduce its exposure to unexpected loss; the trader issues additional shares to increase its capital account; the trader becomes listed on an additional exchange to increase its ability to issue additional shares in the future. The transparent trader may also conclude at step 540 that no action is indicated.

Referring back to FIG. 2, in step 256, a surety guarantor adjusts its pricing mechanisms to reflect the information including without limitation the information provided in steps 225 and 241. The surety guarantor may use an algorithm to do this, or may use other ways, such as judgment. Examples of causes of changes in pricing mechanisms include, without limitation: changes in data; changes in the lists of contracts and surety guarantees; changes in perception of risk; changes in interest rates; statements by regulators, auditors or others; and changes in the surety's financial strength. Examples of ways that pricing mechanisms might be adjusted include, without limitation: changes in parameters in pricing formulas; changes in decision rules; and changes in the use of judgment or algorithms.

In step 260, the transparent trader rebalances its portfolio of securities and contracts in light of expected gains net of all expenses including but not limited to transaction costs and the costs of any surety guarantees. Examples of the qualities that traders might change their portfolios include, without limitation: leverage of its net worth; exposure to catastrophic property losses; exposure to currency changes; immunization against changes in interest rates; co-variation with other market measures and statistical measures of volatility around general trends (these last two include both the Beta of securities portfolio theory and the "Greeks" of derivatives portfolio theory); exposure to changes in political regimes; exposure to changes in price levels or prices of individual contracts or securities. To improve its portfolio, the transparent trader issues market orders. When each transaction clears, the transaction affects one or more of the qualities that the transparent trader seeks to control without affecting the trader's book value. Therefore, the trade itself will occasion neither a financial gain or loss. Because a transparent trader will show neither profit nor loss arising from its own trading activity, it will trade so as to manage its portfolio, not its income statement.

A transparent trader has an incentive to rebalance its portfolio of securities and other contracts upon the arrival of any information about prices or other factors that affect the portfolio. Subject to practical constraints such as the costs of executing transactions, a transparent trader will place orders to improve its portfolio after each change in information. The transparent trader reports the changes in the prices of its holdings moment by moment as a series of changes in its book value and its franchise value, whether it rebalances its portfolio or not. The transparent trader may also observe that its premium for its surety guarantee is changing. Because its holdings are marked to market, the transparent trader does not incur a gain or loss when it issues the "buy at market" order or the "sell at market" order. For the same reason, the transparent trader incurs a gain or loss when news arrives about market prices of its holdings, even if it does not participate in the transaction, bid or offer.

In a preferred embodiment, there exist a sufficiently large number of contracts listed on one or more contracts exchanges and a sufficiently large number of transparent traders that liquid liabilities are traded or tradable often, preferably at all times. Transparent traders holding debtor positions in such contracts are able to liquidate part or all of their holdings often, preferably at all times. Preferably, a large amount of data about price changes is arriving at all times. Such data promotes rebalancing. Rebalancing by a plurality of transparent traders promotes liquidity on a contracts exchange because it benefits each trader to trade a part of its holdings as information arrives even if that information is not about a contract held by that transparent trader.

In step 261, a contracts exchange acts to maintain liquidity for its contracts by substantially restricting trading activity to transparent traders and otherwise supporting the traders' means of rebalancing their portfolios. Practical considerations may be important. The contracts exchange might maintain lists of contracts and securities that it deems liquid. The contracts exchange can monitor the transparent traders, including, without limitation, their transparency, liquidity, franchise value and counterparty risk. The contracts exchange might monitor traders who are not permitted to trade on the exchange as well as those who are. The contracts exchange might act as the surety guarantor for a listed trader. The contracts exchange might monitor the sureties, including without limitation their terms and prices, and the surety's own surety guarantees. The contracts exchange might maintain a list of acceptable sureties; it might publish standards for a surety to follow to become listed. The contracts exchange might act as the surety guarantor for a surety guarantor that provides a surety guarantee to a listed trader. The contracts exchange might control or arrange for market makers which would have authority and responsibility to promote liquidity, including, without limitation: rights to acquire all units of thinly traded contracts; rights to underwrite new issues of contracts; rights to assume risks of loss from transparent traders. The contracts exchange might require traders or their sureties to grant the contracts exchange certain rights (as, for example, the New York Stock Exchange has the right to de-list stocks that fall below a certain share price).

It will be appreciated that the elimination of collateral requirements and margin accounts in particular enables a contracts exchange to operate with settlement periods other than once or twice a day, or even without settlement times. Alternatively, settlement periods may be so frequent so as to essentially eliminate moments at which obligations are unpaid.

Referring back to FIG. 1, the trading system 100 includes surety guarantors 160 who provide surety guarantees in the event of default by a trader. Preferably a surety guarantee is a performance bond that enables the guarantor to stand in the stead of a transparent trader 130 or a financial guarantee that provides for payment in the event of a default by a trader. By maintaining in force a surety guarantee, including paying the appropriately determined premiums for such surety guarantee, traders can trade on the contracts exchange 110 under a beneficial effect of the surety guarantee rather than collateral or margin accounts.

The contracts exchange 110 may operate without price change limits because the transparent traders do not have margin accounts that are at risk. Operating without price change limits enhances liquidity for the contracts listed on that exchange. The liquidity of contracts listed on an exchange without collateral, margin accounts or price change limits is enhanced by the transparency and financial integrity of the traders. The transparency and financial integrity of those traders relate to the liquidity of the securities in which the traders invest and the liquidity of the contracts the traders trade. This liquidity relates to the ability of the risk exchange to operate without collateral, margin accounts or price change limits.

By eliminating the costs of maintaining and monitoring collateral and margin accounts, the preferred system 100 reduces the frictional costs of operating a futures exchange. Existing futures exchanges may wish to adopt the preferred system 100 for all or part of their operations.

The trading system 100, particularly the contracts exchange 110, preferably applies a set of standards to traders trading on the contracts exchange 110. Examples of such standards include without limitation:

Requiring the trader to have its shares eligible for valuation by marking to market, such as requiring the trader to have its shares actively traded so as to be eligible for valuation using Level 1 of Financial Accounting Standard 157, which is incorporated by reference as if fully set forth herein Requiring the trader to maintain in force a surety guarantee, a financial guarantee, and/or a surety policy Requiring the trader to make available for inspection a balance sheet showing its assets and liabilities, including exchanges on which the assets and liabilities are traded and current market prices of the assets and liabilities. This may include requiring the trader to disclose its balance sheet information to a third party at specific times specified in a particular contract.

Requiring the trader to be an entity that is regulated by securities laws to protect the interests of an investor who holds a security interest Requiring that the trader has only a single class of ownership Requiring the trader to be listed on a securities exchange Permitting investors to trade shares of the trader without requiring the investors to provide a surety, margin account or collateral Making shares of the trader available for trade at all times It will be appreciated that the preferred methods and systems described herein not only reduce the transactional costs per trade of a contract, but also substantially lessen or even eliminate the burdensome threshold requirements which impede one's ability to trade contracts.

Since the steps in the preferred method 100 may also be applied to existing futures exchanges, the method 100 also comprises a preferred method of operating and/or restructuring an existing futures exchange.

The capital markets invest in more than $50 trillion of net worth world-wide. Preferably a significant part of the capital markets will adopt preferred method 100. Persons with ordinary skill in the art can foresee the operation of hundreds of transparent traders 130 with assets in the aggregate in excess of $50 trillion and net worth (assets minus liabilities) in excess of $10 trillion placing tens of thousands of trading orders daily on dozens of contracts exchanges 110. The rate of information flow may be on the order of the worldwide capacity of the Internet in 2005, and a measurable fraction of the worldwide flow of all types of information by then.

Persons with ordinary skill in the art will appreciate that this will lead to faster resolution of speculative bubbles thereby reducing the need for government action to cope with the fallout of such bubbles.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in the above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for operating a contracts exchange, comprising:
    trading contracts on the contracts exchange by traders using a computer or computer network;
    requiring each trader on the exchange to substantially limit all its holdings to exchange-traded securities or exchange-traded contracts or cash in order to trade on the exchange;
    requiring each trader on the exchange to maintain a balance sheet of its holdings for inspection; and
    allowing each trader to trade on the exchange without collateral.

2. The method of claim 1, wherein requiring each trader on the exchange to substantially limit all its holdings to exchange-traded securities or exchange-traded contracts or cash comprises:
    requiring each trader to have no liabilities other than liquid exchange-traded contracts and no assets other than liquid exchange-traded contracts or liquid exchange-traded securities or cash.

3. The method of claim 1, further comprising:
    requiring each trader to demonstrate diligence in divesting each holding that is not a liquid, exchange-traded asset or liability.

4. The method of claim 3, wherein requiring each trader to demonstrate diligence comprises:
    requiring each trader to show that the trader has placed an order to sell at market price each asset that is not a liquid, exchange-traded asset and to show that the trader has placed an order to buy to close at market price each liability that is not a liquid, exchange-traded liability.

5. The method of claim 1, wherein requiring each trader on the exchange to substantially limit all its holdings to exchange-traded securities or exchange-traded contracts or cash comprises:
    requiring each trader to demonstrate that the trader's holdings are marked to their fair market value using a currently acceptable method of accounting.

6. The method of claim 5, wherein requiring each trader to demonstrate that the trader's holdings are valued according to their fair market value comprises:
    requiring each trader to demonstrate that each asset and liability on the trader's balance sheet is valued according to Level 1 or Level 2 of Financial Accounting Standard 157.

7. The method of claim 6, wherein requiring each trader to demonstrate that the trader's holdings are valued according to their fair market value using the methods of Level 1 or Level 2 of Financial Accounting Standard 157 comprises:
    requiring each trader to demonstrate that a time series of the trader's book value is not statistically significantly different from a time series constructed exclusively for the trader's assets and liabilities that are valued according to Level 1 or Level 2 of Financial Accounting Standard 157.

8. The method of claim 5, wherein requiring each trader to demonstrate that the trader's holdings are valued according to their fair market value using the methods of Level 1 or Level 2 of Financial Accounting Standard 157 comprises:
    requiring each trader to demonstrate that measures of Standard Portfolio Analysis for Risk (SPAN) for the trader are the same as for assets and liabilities of the trader that are valued according to Level 1 or Level 2 of Financial Accounting Standard 157.

9. The method of claim 5, further comprising:
    making the balance sheet of all holdings of the trader available to a third party.

10. The method of claim 5, wherein allowing each trader to trade on the exchange without collateral further comprises:
    allowing each trader to trade on the exchange without a margin account.

11. The method of claim 5, further comprising:
    operating the contracts exchange without price change limits.

12. The method of claim 5, further comprising:
    requiring each trader to obtain a surety guarantee which does not use a margin account.

13. The method of claim 12, wherein the surety guarantee comprises a financial guarantee.

14. The method of claim 13, wherein the surety guarantee comprises a financial guarantee for a liability of the trader.

15. The method of claim 12, wherein the surety guarantee comprises a performance bond.

16. The method of claim 15, wherein the surety guarantee comprises a performance bond for an obligation of the trader.

17. The method of claim 1, wherein requiring each trader on the exchange to maintain the balance sheet of its holdings for inspection further comprises:
    maintaining a computer database comprising a copy of the balance sheet.

18. A method for operating a contracts exchange, comprising:
    trading contracts on a contracts exchange by traders using a computer or computer network;
    requiring each trader on the exchange to substantially limit all its holdings to exchange-traded contracts or exchange-traded securities or cash in order to trade on the exchange;
    requiring each trader on the exchange to maintain a balance sheet of its holdings for inspection; and
    allowing each trader to trade on the exchange without at least one conventional counterparty risk measure.

19. The method of claim 18, wherein requiring the trader to substantially limit all its holdings to exchange-traded contracts or exchange-traded securities or cash comprises requiring the trader to hold only exchange-traded contracts or exchange-traded securities or cash.

20. The method of claim 18, further comprising:
    requiring the trader to report in real time the holdings and their fair market value.

21. The method of claim 18, wherein requiring the trader to substantially limit all its holdings to exchange-traded contracts and securities comprises requiring the trader to hold only liquid exchange-traded contracts or liquid exchange-traded securities or cash.

22. The method of claim 18, wherein requiring each trader on the exchange to substantially limit all its holdings to exchange-traded contracts or exchange-traded securities or cash comprises requiring each trader to demonstrate diligence in divesting each holding that is not a liquid, exchange-traded asset or liability.

23. The method of claim 22, wherein requiring each trader to demonstrate diligence comprises requiring each trader to show that the trader has placed an order to sell at market price each asset that is not a liquid, exchange-traded asset and to show that the trader has placed an order to buy to close at market price each liability that is not a liquid, exchange-traded liability.

24. The method of claim 22, wherein requiring each trader to demonstrate diligence comprises requiring each trader to show that the trader has placed an order to sell at market price each exchange-traded asset that is not liquid and to show that the trader has placed an order to buy to close at market price each exchange-traded liability that is not liquid.

25. The method of claim 22, wherein requiring each trader to demonstrate diligence comprises requiring each trader to show that the trader has placed an order to buy, and an order to sell a minimum amount of each contract which is exchange-traded, but that the exchange has deemed non liquid.

26. The method of claim 18, wherein allowing each trader to trade on the exchange without at least one conventional counterparty risk measure comprises allowing each trader to trade on the exchange without a margin account.

27. The method of claim 18, wherein allowing each trader to trade on the exchange without at least one conventional counterparty risk measure comprises allowing each trader to trade on the exchange without collateral.

28. The method of claim 18, wherein allowing each trader to trade on the exchange without at least one conventional counterparty risk measure comprises operating the contracts exchange without price change limits.

29. The method of claim 18, wherein allowing each trader to trade on the exchange without at least one conventional counterparty risk measure comprises operating the contracts exchange with settlement periods other than once or twice a day.

30. The method of claim 29, wherein operating the contracts exchange with settlement periods other than once or twice a day comprises operating the contracts exchange without settlement times.

31. The method of claim 29, wherein operating the contracts exchange with settlement periods other than once or twice a day comprises operating the contracts exchange with settlement periods so frequent as to essentially eliminate moments at which the contracts are not settled.

32. The method of claim 18, further comprising:
requiring each trader to obtain a surety guarantee which does not use a margin account.

33. The method of claim 32, wherein the surety guarantee comprises a financial guarantee.

34. The method of claim 33, wherein the surety guarantee comprises a financial guarantee for a liability of the trader.

35. The method of claim 32, wherein the surety guarantee comprises a performance bond.

36. The method of claim 35, wherein the surety guarantee comprises a performance bond for an obligation of the trader.

37. The method of claim 18, wherein requiring each trader on the exchange to substantially limit all its holdings to exchange-traded contracts or exchange-traded securities or cash comprises requiring each trader to demonstrate that the trader's holdings are marked to their fair market value using the methods of Level 1 or Level 2 of Financial Accounting Standard 157.

38. The method of claim 37, wherein requiring each trader to demonstrate that the trader's holdings are valued according to their fair market value using the methods of Level 1 or Level 2 of Financial Accounting Standard 157 comprises requiring each trader to demonstrate that each asset and liability on the trader's balance sheet is valued according to Level 1 or Level 2 of Financial Accounting Standard 157.

39. The method of claim 37, wherein requiring each trader to demonstrate that the trader's holdings are valued according to their fair market value using the methods of Level 1 or Level 2 of Financial Accounting Standard 157 comprises requiring each trader to demonstrate that a time series of the trader's book value is not statistically significantly different from a time series constructed exclusively for the trader's assets and liabilities that are valued according to Level 1 or Level 2 of Financial Accounting Standard 157.

40. The method of claim 37, wherein requiring each trader to demonstrate that the trader's holdings are valued according to their fair market value using the methods of Level 1 or Level 2 of Financial Accounting Standard 157 comprises requiring each trader to demonstrate that measures of Standard Portfolio Analysis for Risk (SPAN) for the trader are the same as for assets and liabilities of the trader that are valued according to Level 1 or Level 2 of Financial Accounting Standard 157.

41. The method of claim 18, further comprising making the balance sheet of the trader's holdings available to a third party.

42. The method of claim 18, wherein requiring each trader on the exchange to maintain the balance sheet of its holdings for inspection further comprises:
maintaining a computer database comprising a copy of the balance sheet.

43. A method for operating a contracts exchange, comprising:
trading contracts on the contracts exchange by traders using a computer or computer network;
requiring each trader on the exchange to substantially limit all its holdings to exchange-traded securities or exchange-traded contracts or cash in order to trade on the exchange;
requiring each trader on the exchange to maintain a balance sheet of its holdings for inspection;
allowing each trader to trade on the exchange without collateral;
requiring each trader to demonstrate diligence in divesting each holding that is not a liquid, exchange-traded asset or liability; and
requiring each trader to obtain a surety guarantee which does not use a margin account.

44. The method of claim 43, wherein requiring each trader on the exchange to maintain the balance sheet of its holdings for inspection further comprises:
maintaining a computer database comprising a copy of the balance sheet.

* * * * *